United States Patent [19]
Linley, Jr.

[11] 3,750,297
[45] Aug. 7, 1973

[54] ULTRA-ACCURATE GAUGING APPARATUS
[76] Inventor: Francis M. Linley, Jr., Banks Rd., Easton, Conn. 06612
[22] Filed: Apr. 5, 1971
[21] Appl. No.: 130,991

[52] U.S. Cl. ............................... 33/174 L, 33/174 P
[51] Int. Cl. ........................... G01b 5/02, G01b 5/16
[58] Field of Search ....................... 33/174 L, 174 P, 33/179.5 E; 308/DIG. 1, 3 R

[56] References Cited
UNITED STATES PATENTS

| | | | |
|---|---|---|---|
| 3,504,441 | 4/1970 | Linley et al. | 33/174 L |
| 2,914,861 | 12/1959 | Flair | 33/174 E |
| 1,648,441 | 11/1927 | Brower | 308/3 R |
| 2,410,877 | 11/1946 | Hall | 33/174 H |
| 3,237,312 | 3/1966 | Boppel | 33/174 L |
| 1,236,511 | 8/1917 | Waring | 308/240 |

Primary Examiner—Stanley N. Gilreath
Assistant Examiner—Jon W. Henry
Attorney—H. Gibner Lehmann

[57] ABSTRACT

An ultra-accurate apparatus for gauging the accuracy of workpieces such as screw threads and the like. The workpiece and an accurate gauging standard or template are disposed on a base alongside each other, and are contacted respectively by pilot and sensing probes mounted on a single carriage which has a substantially friction-free fluid bearing arranged to provide for translational movement of the carriage horizontally along the workpiece and the gauging standard, and also for pivotal movement in vertical parallel planes. The carriage also carries an indicator and an electronic movement-amplfying means which connects the sensing probe to the indicator whereby minute changes in the position of the probe are evidenced in a magnified manner by the indicator. The friction-free fluid bearing comprises a bar or slide which is continuously rotated. In one embodiment the bar is at least partially immersed in a liquid such as kerosene, in which it slowly turns. In another embodiment the bar is in air, and is either turned more rapidly or engaged with larger bearing surfaces, or both. Bearings of the carriage rest on the slide bar. Due to the provision of the specific type friction-free bearing of the invention and the carrying of the indicator (which is self contained) by the carriage, there are no trailing wires, flexible air tubes or any other connections whatsoever between the carriage and the base or other parts of the apparatus. Since the only contact between the carriage and the base is through the substantially friction-free liquid or fluid bearing, no adverse influences are brought to bear on the carriage, which might impair the readings of the indicator. In consequence, gauging to tolerances of less than ten millionths of an inch is consistently possible.

10 Claims, 8 Drawing Figures

PATENTED AUG 7 1973 3,750,297

INVENTOR.
Francis M. Linley Jr.
BY H. Gilbner Lehmann
AGENT

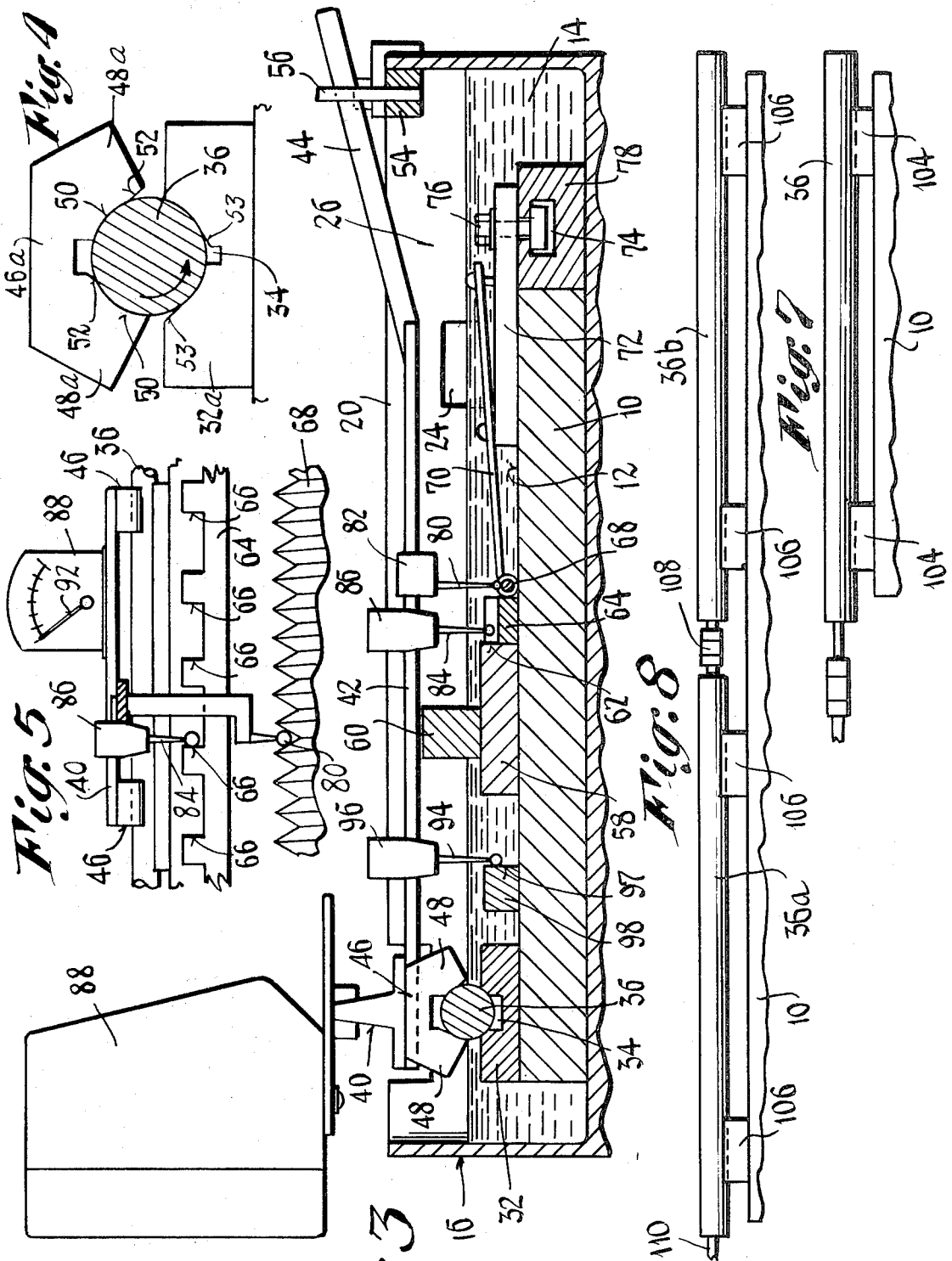

ULTRA-ACCURATE GAUGING APPARATUS

BACKGROUND AND FIELD OF THE INVENTION AND STATE OF THE PRIOR ART

In the past various types of accurate gauging devices have been proposed and produced, to provide an accurate check of precision workpieces such as ground screw-thread parts or similar articles. One type of gauging device involved the use of a movable carriage provided with pilot and sensing probes which were adapted to respectively engage a workpiece and an adjoining gauge standard. Minute changes in the position of the sensing probe were translated into electrical voltages, amplified, and then transmitted to an electronic indicator, thereby to provide an indication of the extent of deviation of the workpiece from the gauge standard. Such a type of gauging apparatus is described and claimed in my U.S. Pat. No. 3,504,441 issued Apr. 7, 1970 and entitled "Apparatus for Comparing With a Length Standard the Spacing of Test Points in a Workpiece". In this prior patent an essentially friction-free bearing was provided for the carriage by supplying compressed air through a flexible hose to the carriage bearing collars whereby a film of air continuously existed between the bearing surfaces. The indicator device was mounted on a stationary base and connected to the sensing probe by a slender and flexible cable or wire. The probe included a transducer by which changes in the position of the probe provided voltages to actuate the electrical or electronic indicator.

Other prior devices variously utilized air bearings and electronic indicators in different arrangements, the indicators being carried by the frame or base and being connected to the sensing probe by flexible wires. The air bearings made it necessary to supply the collar portions of the bearings with compressed air, inasmuch as these were the parts required to travel along the slide bar or track. I have found that even the small drag or pull occasioned by the very flexible connecting hose and fine connecting wires adversely affected the accuracy of these prior gauges. In some instances prior workers in the field, for temperature control purposes, immersed the entire gauging apparatus in a liquid such as kerosene or the like. However, there still remained the adverse influence occasioned by the electrical and hose connections to the carriage. Thus there always existed a drag caused by the fluid connections, as well as the electrical connections (even if these latter were fine wires) between the sensing probe and the electronic indicator, for the reason that the indicator was stationarily mounted on the machine frame or base.

SUMMARY OF THE INVENTION

The above drawbacks and disadvantages of prior gauging devices are obviated by the present invention, which has for one object the provision of an improved ultra-accurate gauging apparatus characterized by a carriage having a friction-free fluid bearing so arranged as to enable it to have both translational and pivotal movements, the improved apparatus being so constituted that all drag or other retarding or accuracy-impairing influences have been removed from the carriage whereby it responds in an extremely sensitive manner solely to the influence of the probes that it carries. In conseqeunce there is had a greatly improved gauging accuracy. Another object of the invention is to provide an improved ultra-accurate gauging apparatus in accordance with the foregoing, which is especially simple in its construction, involving relatively few parts which may be readily produced by known methods. These objects are accomplished, in one embodiment of the invention by an apparatus wherein a slide bar of shaft serving as a track is at least partially immersed in a liquid bath and supports a carriage by means of bearing blocks thereon, the shaft being continuously slowly turned in order to produce a continuous unbroken liquid film between it and the carriage bearings. In another embodiment the shaft turns in air but at a faster rate, and the bearing surfaces are more extensive or larger. By such arrangements, an essentially friction-free liquid or fluid mounting is had for the carriage. Pilot and sensing probes are mounted on the carriage and respectively engage a workpiece and a gauge template or standard when the carriage is brought into its gauging position. The carriage further mounts an electronic indicator which is connected to the sensing probe by a movement-amplifying actuator means also carried by the carriage. With such a construction no connections are required between the carriage and any of the other, stationary parts of the apparatus since the well-known prior art hose connection to the bearing blocks has been eliminated, as well as all electrical cable or connecting wires coming from the carriage. The now wholly uninfluenced carriage as a consequence responds solely to the action of the pilot probe; therefore, due to the absence of any detracting influences on the carriage, extremely accurage gauging is made possible.

Other objects and advantages of the invention reside in the provision of an improved ultra-accurate gauging apparatus as above characterized, which is especially reliable in its functioning; a gauging apparatus of the type indicated, which has incorporated in it compensating means by which automatic damping of the indicator is had to compensate for extremely slight dimensional variations of the continuously turning slide bar, such as out of round conditions normally present in spite of precision manufacture of the bar, and also any minor excursions of the carriage from a truly straight path; and an improved gauging apparatus as characterized, which is simple in operation, non-critical as to the manipulations required, and not adversely affected by temperature variations or other adverse influences of the surrounding environment.

Still other features and advantages will hereinafter appear.

DESCRIPTION OF THE DRAWINGS

FIG. 3 is a transverse vertical sectional view, taken on the line 3—3 of FIG. 1. This figure also reveals a liquid tank and a bath, as of kerosene or similar liquid.

FIG. 4 is a detail showing the mounting for the slide bar or track, and the construction of the bearing blocks for the carriage, the arrangement being particularly suitable where the bar is turning in air rather than turning in a liquid.

FIG. 5 is a diagrammatic representation of certain cooperative working parts of the apparatus looking at the front thereof, this view illustrating the pilot and sensing probes, the carriage carrying the same, and the electronic indicator mounted on the carriage. Also shown is a portion of a workpiece being gauged, and a gauge standard adjoining the workpiece, both engaged by their respective probes.

FIG. 7 is a fragmentary front elevational view of a slide bar or track, illustrating a modified form of mounting means therefor.

FIG. 8 is a fragmentary front elevational view of a compound or multi-part slide bar or track arrangement having an extended length.

DESCRIPTION OF THE PREFERRED EMBODIMENT

Figure 1:
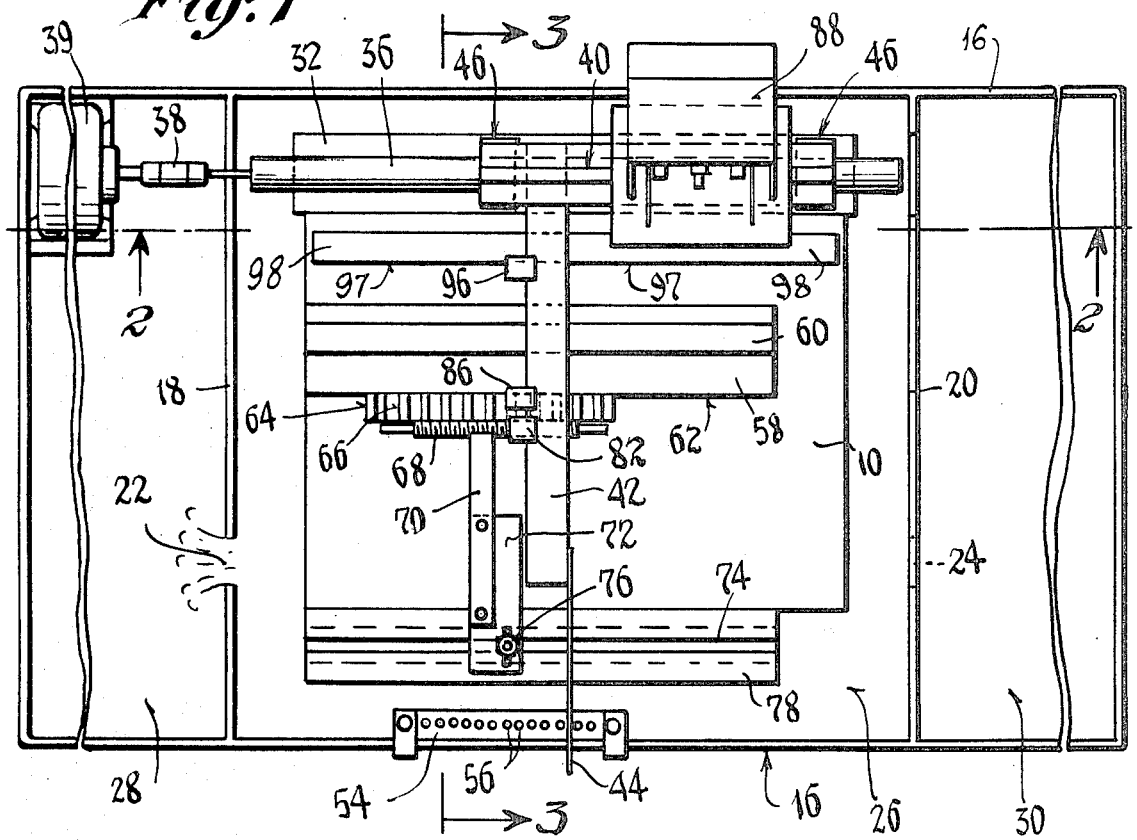
FIG. 1 is a top plan view of the improved ultra-accurate gauging apparatus as provided by the invention, utilizing a liquid tank and bath.
Figure 2:
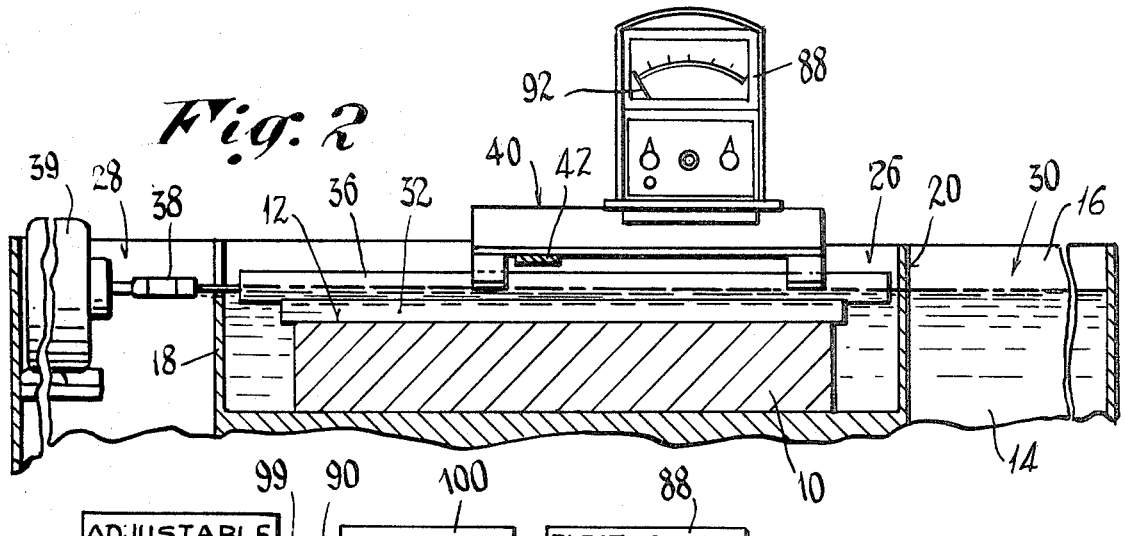
FIG. 2 is a fragmentary view partly in vertical section and partly in front elevation, taken on the line 2—2 of FIG. 1.

Considering first FIGS. 1-3 there is illustrated a machine bed or base 10 which can be advantageously constituted of granite having a highly polished micro-accurate top surface 12. The base 10 is immersed in a liquid bath, such as a pool or kerosene 14 or the like, contained in an open-top rectangular tank 16. The tank 16 has partitions 18, 20 provided respectively with liquid outlet and inlet openings 22, 24. Between the partitions 18, 20 is the main tank area designated generally by the numeral 26, in which the base or bed 10 is disposed. Formed by the partition 18 is a compartment 28 receiving liquid which is discharged through the passage 22, such liquid being strained or filtered, temperature-controlled, and pumped back into a supply compartment 30 formed by the partition 20, to be introduced again into the main compartment 26 through the passage 24. Thus the liquid bath 14 is maintained at a desired level, and its temperature is also closely controlled. The top surface of the liquid bath 14 is located an appreciate distance above the top surface 12 of the base 10, as clearly seen in FIG. 3.

At the rear portion of the base 10 there is provided an elongate bearing member 32 having a longitudinal groove 34 with chamfered edges, for receiving a round slide bar or shaft 36 (hereinafter also referred to as a track). As seen in FIGS. 1 and 2, the slide bar 36 has a flexible coupling 38 driven by a gearhead motor 39 at a relatively slow speed, as for example under 100 r.p.m.

As provided by the invention, there is an elongate carriage 40 which is mounted by a substantially friction-free liquid bearing means, to have translational horizontal movement along the slide bar 36 and also pivotal movement in vertical, parallel planes. The carriage 40 has a forwardly extending arm 42 provided with a handle 44 by which it can be manually manipulated to effect such trans-lational and pivotal movements. As seen in FIGS. 1-3, the carriage 40 has a pair of bearing blocks 46 which are adapted to engage the slide bar or track 36 along upper portions thereof. Referring to FIG. 4 which shows a similar bearing block 46a, this is seen to comprise a pair of depending portions 48a having arcuate surfaces 50 of the same curvature as the slide bar 36. The portions 48a also have their leading edges relieved or cut back, as indicated at 52, to prevent liquid which is being carried by the turning slide bar from being scraped off the latter. Instead, such liquid will be carried between the curved surfaces 50 of the blocks 46a and the corresponding cooperable surfaces of the slide bar 36, forming a continuous film therebetween by which there is had a substantially friction-free liquid bearing for the carriage 40. It will be noted that such bearing requires no compressed air, nor connections between compressed air hoses and the carriage as was heretofore utilized in prior gauging devices. In FIG. 4 the bearing 32a which is similar to the bearing 32 of FIG. 3 in general, is shown as having leading edges 53 which are relieved in the same manner as the reliefs 52 of the bearing block 46a.

At its front edge the tank 36 has mounted on it an elongate guide member 54 having upstanding pegs 56 adapted to loosely receive between them the handle 44, thereby to effect a rough positioning of the carriage 40 and the forwardly extending arm 42 thereof.

On the bed or base 10 there is mounted an elongate block or straight edge 58 provided with a carriage rest 60 that is engageable with the underside of the carriage arm 40 to locate the arm in a horizontal position when the handle 44 is disposed between an adjoining pair of guide pins 56.

The straight-edge of the block 58 is required to be perfectly parallel with the slide bar or shaft 36. Along the front surface 62 of the member 58, which surface constitutes the accurate straight edge thereof, there is disposed the gauge template or standard 64 which has a plurality of gauging shoulders 66. Extending alongside the gauge 64 is the workpiece 68, which is shown as being in the form of a screw. The workpiece 68 may be clamped in position by a rearwardly extended clamping arm 70 carried by a clamp member 72 secured in place by means of a T-slot 74 and bolt 76. The slot 74 is provided in a separate bar 78. With such arrangement, the gauge 64 and the workpiece 68 will be perfectly parallel with the slide bar or track 36, and the carriage 40, 42 can be shifted to the left or right as viewed in FIGS. 1 and 2, so as to bring the arm 42 over different portions of the gauge 64 and workpiece 68.

On the carriage arm 40 there is rigidly mounted a pilot probe 80 carried by a block 82, the probe being engageable with portions of the screw or workpiece 68 in the manner indicated in FIG. 5. Also on the carriage arm 40 there is a sensing probe 84 carried by a transducer 86 attached to the arm.

Figure 6:
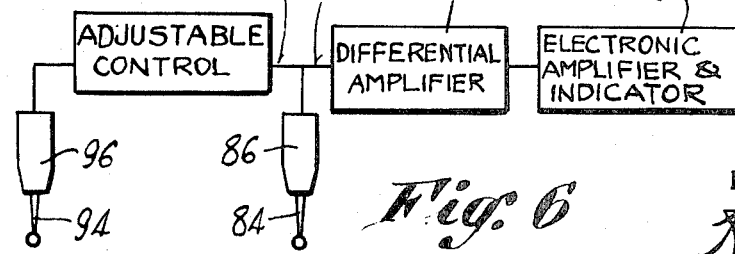
FIG. 6 is a schematic circuit diagram of the sensing probes, electronic indicator, and actuator means between the indicator and the sensing probes.

In accordance with the present invention, there is further mounted on the carriage 40 a self-contained electronic indicator 88, which is connected to the transducer 86 by a suitable cable indicated diagrammatically in FIG. 6 by the numeral 90. The electronic indicator 88 can have in the same casing an amplifier, as is well understood. With such arrangement, changes in the positioning of the sensing probe 84 will be converted to electrical voltages, which will be amplified and impressed on the indicator 88 to cause deflection of the needle 92 thereof. By virtue of the amplifier and indicator 88 being carried by the carriage 40, the presence of the connecting cable 90 between the indicator 88 and the transducer 86 will have no influence whatsoever on the movements of the carriage 40, and thus there is avoided a factor which heretofore introduced inaccuracy or error in the readings of the gauging apparatus.

It will now also be understood that by the immersion of the workpiece, gauge standard and slide bar or track in a liquid of controlled temperature, there are avoided distortions and inaccuracies which otherwise would arise due to temperature changes in the environment surrounding the gauging apparatus.

In the operation of the apparatus, the carriage 40 and arm 42 thereof are shifted to different positions along the gauge 64 and workpiece 68 by means of the carriage handle 44 being placed between different pairs of upstanding guide pins 56 of the front guide piece 54. As the carriage arm 42 is lowered, the pilot probe 80 will engage different sections of the thread of the workpiece 68, coming to rest between the crests in the manner indicated in FIG. 5. At the same time, the sensing probe 84 will engage a gauging surface of the gauge 64, and deviations in the position of the probe 84 will be manifested by the deflection of the indicator needle 92, either to the right or to the left from a median position. The movements of the carriage 40 are especially easily effected by virtue of its friction-free liquid mounting on the turning slide bar or track 36, as will be understood.

Due to the absence, in accordance with the invention, of all wires, hoses and the like from the carriage 40, 42 the latter will at no time experience adverse physical forces, and therefore especially accurate gauging of the workpiece 68 can be obtained, this being aided by the temperature control of the bath 14.

Still further accuracy in gauging can be had, in accordance with the present invention. I have found that, even though the slide bar 36 is made as accurately as possible, there is a likelihood that it will vary ever so slightly in its cross section, toward an oval shape. Also, slight variations in straightness can occur in the bearing bar 36. For such conditions, as the bar is turned, there will result a slight forward and backward travel of the carriage 40 and arm 42 thereof (or travel from left to right and vice versa as viewed in FIG. 3). Such slight movement, while not of very great concern, can adversely affect the operation of the apparatus. Considering FIG. 3, the left or right movement of the arm 42 will result in the pilot probe 80 riding along the curved trough of the thread of the workpiece 68. Since the trough extends in a helix, this will also result in a slight lateral movement of the carriage arm 42, that is, a movement to the right or to the left as viewed in FIGS. 1 and 2, and this in turn will cause deflections of the sensing probe 84 and of the indicator needle 92. Such deflections will be continuous and in opposite directions due to the continuous turning of the slide bar 36.

In accordance with this invention such deflections may be minimized or eliminated entirely by the provision of a compensating sensing probe 94 and cooperable straight edge, said probe being carried by a transducer 96 which is mounted on the carriage arm 42. The transducer 96, as seen in FIG. 6, is connected with an adjustable control to vary its output, and is thereafter connected by a wire or cable 99 to a differential amplifier 100 which is also fed from the transducer 86 of the sensing probe 84. From the differential amplifier 100 the signals are brought to the amplifier and indicator 88 mounted on the carriage 40. The action of the sensing probe 94 is such that it opposes the signals resulting from the slight undesired movements of the sensing probe 84 due to the pilot probe 80 moving forward and backward along the helical groove between adjoining crests of the screw thread of the workpiece 68. Thus, any slightly out-of-round shape of the slide bar or track 36 and variations of the bearing block 32 which cause undesired movements of the sensing probe 88 will be counteracted by the opposing effect of the probe 94 whose output is being fed into the differential amplifier 100. The probe 94 engages an accurate straight edge surface 97 of a member 98 which is placed on the bed or base 10 and arranged to be perfectly parallel with the workpiece 68.

It is thus seen that variations in the diameter of the slide bar 36, as when it is slightly out-of-round, can be compensated for by the supplementary sensing probe 94 whereby there is minimized or eliminated entirely any back-and-forth movement of the indicator pointer 92 by nullifying the effect of slight forward and rearward movements of the carriage 40 and arm 42 thereof, as occasioned by slide bar inaccuracy and/or lack of parallelism of the bearing 32 with the workpiece 68.

Whereas in FIGS. 1–3 the slide bar 36 is shown as being carried by a single elongate bearing member 32, the bar instead may be carried by a pair of bearing members 104 set on the base 10 as illustrated in FIG. 7. Where the slide bar or track is to have appreciable length, it can be made of two sections as illustrated in FIG. 8. In this figure there are shown slide bars 36a and 36b which are carried by bearings 106 set on the base 10 of the apparatus. The bars 36a and 36b are connected to each other by a flexible coupling 108, and are driven by a connection 110 through a flexible coupling such as the coupling 36 shown in FIGS. 1 and 2.

According to the invention as exemplified by another embodiment thereof (see FIG. 4) the friction-free liquid bearing for the carriage 40 can be replaced by a friction-free air bearing, while still obviating compressed-air hose connections to the carriage. Considering FIGS. 1–3 as against FIG. 4 the liquid bath 14 can be omitted, and the carriage and base bearings constituted to have increased areas; this, either alone or together with an increased turning speed imparted to the slide bar or shaft, will result in a satisfactory, friction-free air or fluid (gas) bearing. In FIG. 4 the bearing block 46a has depending portions 48a or larger bearing area than the corresponding portions 48 of the blocks 46. Also, the bearing bar 32a has larger bearing surfaces than the bar 32. In addition, the shaft 36 can be driven at a higher speed, as for example 1,000 R.P.M. I have found that, by proper bearing construction and by using highly polished, accurate bearing surfaces a continuous air or gas film which tends to lubricate, can be maintained between the carriage bearings 46a and the bar 36 whereby ultra-accurate gauging is still possible while dispensing wih the liquid bath 14.

It will now be understood from the foregoing that I have provided a novel and improved, ultra-accurate gauging apparatus which, when not adversely affected by temperature changes in the surrounding environment, can accurately gauge workpieces such as threaded shafts, shouldered members or the like with the utmost accuracy, down to tolerances of less than ten millionths of an inch. The extreme accuracy is obtained in large part by mounting the electronic indicator device on he movable carriage and eliminating all connections such as hoses, wires, cables and the like, between the movable carriage and stationary parts of the apparatus, all in conjunction with he substantially friction-free mounting of the carriage on the slide bar and the turning of the slide bar to maintain a fluid film between it and the carriage bearings. The carriage arm 42 is preferably made of Invar (a registered trademark) which is a metal having a very low coefficient of expansion (dimensional variation with changes in temperature.) Constant temperature can be maintained between the working parts of the apparatus by the temperature controlled pool 14 of kerosene or similar liquid. Thus, the temperature of the workpiece 68, the gauge 64, the straight edges 58 and 98, the bearing blocks 32 as well as the slide bar or track 36 are all closely controlled and maintained. Or, a closely controlled ambient temperature can be maintained. The various parts involved are seen to be relatively few and of simple construction, and the apparatus is especially reliable in its functioning and easy to operate and service.

Variations and modifications may be made without departing from the spirit of the invention.

I claim:

1. An ultra-accurate gauging apparatus having a gauge and a workpiece to be checked by the gauge, comprising, in combination:
   a. a base,
   . a container having liquid, in which the base is carried,
   . a carriage movable over the base,
   d. a substantially friction-free bearing immersed in said liquid for mounting the carriage on the base both for translational movement along a horizontal axis and for pivotal movement in vertical, parallel planes,
   e. a pair of probes disposed adjacent each other on the carriage and adapted to respectively simultaneously engage the gauge and the workpiece on the base, to check the accuracy of the workpiece,
   f. an indicator carried by the carriage, and
   g. movement-amplifying actuator means wholly carried by the carriage, connecting the indicator and one of said probes whereby minute changes in the position of said one probe in a given direction are evidenced in a magnified manner by the indicator,
   h. said friction-free bearing comprising a turnable slide bar disposed on the base and drive means for turning the slide bar, and
   i. said drive means effecting a turning of the bar at a speed sufficient to maintain a friction-eliminating fluid film between the bar and the bearings.

2. An apparatus as in claim 1, wherein:
   a. said carriage bearings have relieved surfaces disposed ahead of the load-carrying surfaces thereof with respect to the direction of turning of the bar, and adapted to lead the friction-eliminating fluid between the slide bar and load-carrying bearing surfaces.

3. An apparatus as in claim 1, wherein:
   a. said bar is at least partially immersed in a liquid which supplies the said fluid film.

4. An apparatus as in claim 1 and further including:
   a. an additional probe on the carriage, operable in directions substantially at right angles to the direction of operation of the said one probe,
   b. a differential amplifier wholly carried on said carriage, connected between said one probe and indicator, and
   c. actuator means wholly carried on the carriage, connecting said additional probe to said differential amplifier whereby the indicator registers for independent translational movements of the carriage in directions normal to each other, and
   d. a gauging device on the base, engageable by said additional probe.

5. An apparatus as in claim 4, and further including:
   a) a gauge standard constituting the said gauge of the apparatus, said standard being carried by said base and being engageable by the said one probe, and
   b) a straight edge on said base for engagement by said additional probe.

6. An apparatus as in claim 1, wherein:
   a. the base is constituted of granite.

7. An apparatus as in claim 6, wherein:
   a. the carriage has an elongate arm on which the probes are carried,
   b. said arm being disposed above the level of the liquid and being constituted of a metal of low coefficient of expansion.

8. An apparatus as in claim 1, wherein:
   a. the carriage includes an elongate arm extending laterally from the slide bar and on which the probes are carried,
   b. said indicator being mounted on the carriage at the opposite side of the slide bar from said arm, thereby tending to partially balance the carriage on the bar.

9. An apparatus as in claim 1, wherein:
   a. the slide bar comprises a pair of aligned bar sections and a flexible coupling connecting the same for simultaneous turning movement.

10. An apparatus as in claim 2, wherein:
    a. the carriage bearings comprise blocks each having a pair of curved, spaced apart faces engaging upper portions of the slide bar.

* * * * *